Figure 1:
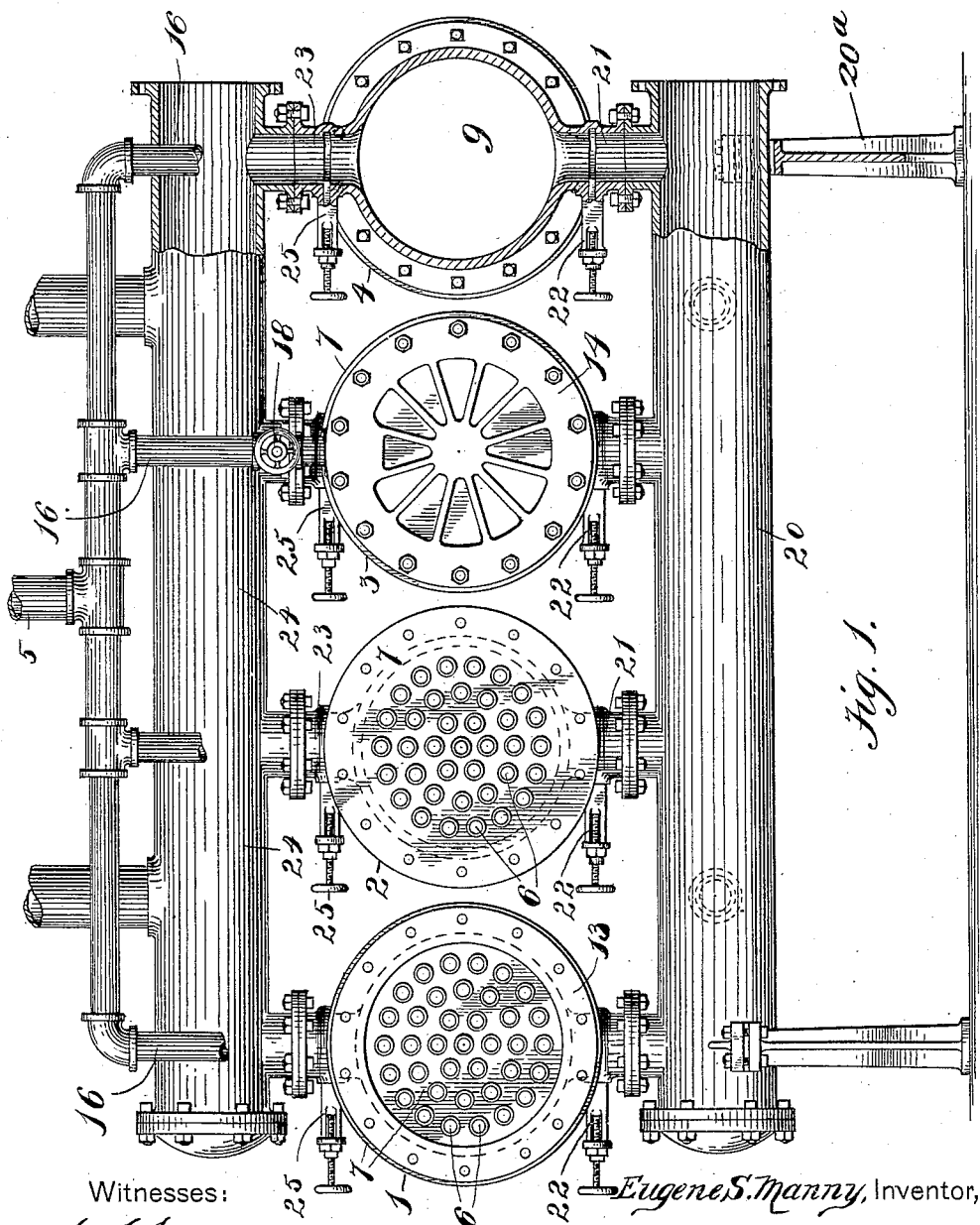

No. 875,362. PATENTED DEC. 31, 1907.
E. S. MANNY.
STEAM AND WATER HEATING APPARATUS.
APPLICATION FILED JUNE 18, 1904.

2 SHEETS—SHEET 1.

Witnesses:

Eugene S. Manny, Inventor,

By Marion & Marion
Attorneys

No. 875,362.  
PATENTED DEC. 31, 1907.  
E. S. MANNY.  
STEAM AND WATER HEATING APPARATUS.  
APPLICATION FILED JUNE 18, 1904.

2 SHEETS—SHEET 2.

Fig. 2.

Witnesses:

Eugene S. Manny, Inventor,

By Marion & Marion
Attorneys

UNITED STATES PATENT OFFICE.

EUGENE S. MANNY, OF MONTREAL, QUEBEC, CANADA.

STEAM AND WATER HEATING APPARATUS.

No. 875,362.  Specification of Letters Patent.  Patented Dec. 31, 1907.

Application filed June 18, 1904. Serial No. 213,064.

*To all whom it may concern:*

Be it known that I, EUGENE S. MANNY, a subject of the King of Great Britain, residing at the city and District of Montreal, in the Province of Quebec, Canada, have invented certain new and useful Improvements in Steam and Water Heating Apparatus; and I do hereby declare that the following is a full, clear, and exact description of the invention, such as will enable others skilled in the art to which it appertains to make and use the same.

This invention relates to new and useful improvements in hot water heating apparatus, and is intended to be used in connection with some suitable source of steam supply, which steam is to be used for heating water, the water to be conducted by suitable pipes to the place or compartment to be heated.

The object of the invention is to produce an apparatus comprising a plurality of water heating compartments, which are connected in parallel to suitable water supply mains or conduits in such manner that water from such mains may be admitted to one or all of such heating compartments, wherein the water may be heated, or reheated, to raise the temperature thereof to the proper degree for heating compartments of a building.

In large buildings, such as hospitals, asylums, &c., it is desirable to regulate the supply of heat according to the weather, and, where but one heating apparatus is used, great difficulty has been experienced in securing the nice adjustment of heat which is so essential to the requirements for such buildings. To overcome difficulties heretofore encountered, the apparatus herewith illustrated and described has been provided, in which a series of heating compartments are provided for the water, each of such compartments being connected with a water supply main and conduit, so that all of the compartments may be used when desired, and steam is admitted to the interior of the compartments, passing through steam pipes therein so as to heat water passing through. Means are also provided so that any one or more of the heating compartments may be cut out of the general system, thereby reducing the radiating or heat producing surface, and to such extent decreasing the supply of heat from the water of the mains to the building.

In the drawings, in which similar numerals of reference indicate corresponding parts in all the views, Figure 1 is an elevational view illustrating the general arrangement of the heating compartments, some parts of said compartments being removed and one compartment being shown in section on the line 4—4 of Fig. 2. Fig. 2 is an end elevational view shown partly broken away and partly in section, for the purpose of better illustrating details of construction thereof.

Referring to the drawings, 1, 2, 3 and 4 denote the several heating compartments of the system. Leading to the compartments 1 to 4 inclusive, in detail as hereinafter shown, is a steam supply pipe 5, which may connect with any suitable source of supply for the purpose of heating the compartments and water passing therethrough.

A feature of this invention is the manner of forming the heating compartments, which, as will be noted in Fig. 2, are provided with steam tubes 6, extending longitudinally thereof, said tubes being supported at their ends in the perforated end walls 7, and so connected therewith as to prevent leakage of water between the connection of said tubes with said walls, thereby rendering the water heating compartments 1 to 4 formed between the end walls within the shell 9, perfectly water tight.

Connected with flanges 10 of the heating compartments, are collars 11 (see Fig. 2) which are provided with the flanges 12 and 13, the flanges 12 being bolted to the flanges 10, and securing thereto the walls 7, and the heads 14 being bolted to the flanges 13 of such collars, whereby there are formed steam chambers 15 between the walls 7 and said heads. Tapping the collars 11 are steam pipes 16 and 17, which are designed to serve respectively as steam inlet and steam outlet conduits therefor.

Valves 18 are provided in the pipes 16, and similar valves 19 are provided in the pipes 17, whereby the supply of steam may be cut off from one or more of the said compartments, which still serve as parts of the conduit for the general circulation of water, and as the quantity of water is not decreased by closing such valves, it will be evident that with the same supply the temperature will decrease when such valves 17 and 19 are closed in part of the series.

The supply main 20, supported on a standard 20$^a$, extends below the heating compartments 1, 2, 3 and 4, and is connected therewith by means of the short leaders 21, in which are placed valves 22. The leaders 21 communicate with the interior of the compartments, and when valves 22 are open, water will pass from the supply main into such compartments, wherein it will be heated by means of the steam in chambers 15 and tubes 6, after which such water will pass out through the short connecting conduits 23 to the hot water supply pipe 24 which leads to the compartments to be heated. In the conduits 23 are placed valves 25 adapted, with the valves 22, to cut out any of said compartments from the circulation system when desired. As each compartment may be cut out in this manner it is evident that one or more of such compartments may be taken out of the circulation system.

The system of circulation may include pumps for forcing the water to any required distance from the heating apparatus herewith shown, but such pumps may be, and have been, placed in any convenient part of the general system, and are so well known as not to require illustration herein.

Assuming the main or return pipe 20 to be connected with the general circulation system of a hot water heating apparatus, it is evident that water will rise through the leaders 21 into the compartments 1, 2, 3 and 4, when the valves 22 are open. The water will be heated in such compartments and pass out through the short conduits 23 to the hot water supply pipe 24, and thence to the building to be heated. When the full capacity of the apparatus is needed, the valves are all left open, and a maximum supply of heat and of water will flow through the apparatus. When less heat is required, one or more pair of the valves 18 and 19 may be closed, and steam thereby cut off from one or more of the heating compartments, leaving the same volume of water to be heated. When the volume of water to be heated is to be reduced, one or more pair of valves 22 and 25 may be closed, thereby lessening the supply of water to the heating compartment.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims, or of mechanical equivalents of the structures set forth.

Having described my invention, what I claim and desire to secure by Letters Patent is:—

1. In a hot water heater, a pair of water mains, a series of water heating compartments connected in parallel between said mains, each compartment comprising a cylindrical casing having an annular flange at each end, and a steam chamber at each end thereof, each of said steam chambers comprising a collar having an annular flange at each end, a perforated end wall held between the flange of said casing and the flange on one end of said collar by a common securing means, and a head detachably secured to the flange on the other end of said collar, tubes supported in said end walls and establishing communication between said steam chambers, means for admitting steam to one of said steam chambers, means for discharging the steam from the other of said chambers, means for admitting water from one of said mains to the intertubular space, and means for discharging it into the other of said mains.

2. In a hot water heater, the combination of a cylindrical casing provided with opposite lateral openings and having an annular flange at one end, a steam chamber at each end of said casing, one of said steam chambers comprising a collar provided with a lateral opening and having an annular flange at each end, a perforated end wall held between the flange on said casing and the flange on one end of said collar by a common securing means, and a head detachably secured to the flange on the other end of said collar, tubes extending through the perforations in said end wall and establishing communication between said steam chambers, means for admitting steam through the opening in said collar into the corresponding steam chamber, means for discharging the steam fron the other of said steam chambers, means for admitting water through the opening in one side of said casing, and means for discharging it through the opening on the opposite side.

In witness whereof I have hereunto set my hand in the presence of two witnesses.

EUGENE S. MANNY.

Witnesses:
FREDERICK H. GIBBS,
JOHN F. DEUFFERWIEL.